United States Patent
Maemura et al.

(10) Patent No.: US 7,925,441 B2
(45) Date of Patent: Apr. 12, 2011

(54) VEHICLE PERIPHERY MONITORING APPARATUS

(75) Inventors: Takahiro Maemura, Okazaki (JP); Masahiro Ikeyama, Nagoya (JP); Shigeya Sasane, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 1252 days.

(21) Appl. No.: 11/362,052

(22) Filed: Feb. 27, 2006

(65) Prior Publication Data

US 2006/0204039 A1 Sep. 14, 2006

(30) Foreign Application Priority Data

Mar. 9, 2005 (JP) ................. 2005-065887

(51) Int. Cl.
*G08G 1/16* (2006.01)
*G05D 1/00* (2006.01)
*G05D 1/02* (2006.01)
*G06F 7/00* (2006.01)
*B60R 22/00* (2006.01)
*H04N 7/18* (2006.01)
*G06K 9/00* (2006.01)
*B60Q 1/00* (2006.01)
*G08B 23/00* (2006.01)

(52) U.S. Cl. ............ 701/301; 348/148; 382/104; 701/1; 701/36; 701/48; 701/300; 340/436; 340/438; 340/460; 340/461; 340/459; 340/435; 340/517

(58) Field of Classification Search ............... 348/46–54, 348/135, 148–149, 158–159, 169, 208.14–208.15; 340/435–436, 964, 961.3, 517–523

See application file for complete search history.

(56) References Cited

U.S. PATENT DOCUMENTS

| | | | | |
|---|---|---|---|---|
| 5,931,547 A * | 8/1999 | Lerner | ................... | 303/193 |
| 6,246,961 B1 * | 6/2001 | Sasaki et al. | ............. | 701/301 |
| 6,292,745 B1 * | 9/2001 | Robare et al. | ............ | 701/208 |
| 6,327,536 B1 * | 12/2001 | Tsuji et al. | .............. | 701/301 |
| 6,594,583 B2 * | 7/2003 | Ogura et al. | ............. | 701/301 |
| 6,714,139 B2 * | 3/2004 | Saito et al. | .............. | 340/903 |
| 6,812,831 B2 * | 11/2004 | Ikeda | ...................... | 340/435 |
| 6,888,447 B2 * | 5/2005 | Hori et al. | ............... | 340/435 |
| 7,113,867 B1 * | 9/2006 | Stein | ....................... | 701/301 |
| 7,130,745 B2 * | 10/2006 | Sherony | .................. | 701/301 |
| 7,190,282 B2 * | 3/2007 | Maemura et al. | ....... | 340/903 |

(Continued)

FOREIGN PATENT DOCUMENTS

JP 6-282655 A 10/1994

(Continued)

*Primary Examiner* — Jason Chan
*Assistant Examiner* — Michael Osinski
(74) *Attorney, Agent, or Firm* — Birch, Stewart, Kolasch & Birch, LLP (57) ABSTRACT

A vehicle periphery monitoring apparatus is comprised of a camera installed in the front or rear of a vehicle, for picking up images of side view of the vehicle; a feature point detecting section that detects feature points in the side images and calculates the motion vectors of the detected feature points; a moving object detecting section that detects a set of a plurality of feature points approaching the vehicle in the side images as an approaching object based on the calculated motion vectors of the feature points; a feature point tracking section that tracks the feature points of the detected approaching object; and a passage time calculating section that calculates the time at which the approaching object passes the front or rear of the vehicle from the feature points of the approaching object tracked by the feature point tracking section.

6 Claims, 6 Drawing Sheets

U.S. PATENT DOCUMENTS

| | | | |
|---|---|---|---|
| 2004/0019420 A1* | 1/2004 | Rao et al. | 701/45 |
| 2004/0107033 A1* | 6/2004 | Rao et al. | 701/45 |
| 2005/0165550 A1* | 7/2005 | Okada | 701/301 |
| 2005/0189471 A1* | 9/2005 | Nagasawa | 250/208.1 |

FOREIGN PATENT DOCUMENTS

| | | |
|---|---|---|
| JP | 8-91122 A | 4/1996 |
| JP | 2001-39248 A | 2/2001 |
| JP | 2001-43494 A | 2/2001 |
| JP | 2001-101421 A | 4/2001 |
| JP | 2002-154375 A | 5/2002 |
| JP | 2002-321579 A | 11/2002 |
| JP | 2004-56763 A | 2/2004 |
| JP | 2004-198211 A | 7/2004 |
| JP | 2005-276056 A | 10/2005 |

* cited by examiner

VEHICLE PERIPHERY MONITORING APPARATUS

BACKGROUND OF THE INVENTION

1. Field of the Invention

The present invention relates to a vehicle periphery monitoring apparatus that monitors the periphery of a vehicle based on an approaching object captured by a camera installed in the vehicle.

2. Description of the Related Art

An example of apparatuses that monitor the periphery of a vehicle based on images picked up by a camera installed in the vehicle is disclosed in Japanese Laid-Open Patent Publication (Kokai) No. 2001-43494 (hereinafter referred to as Patent Document 1). In this vehicle peripheral monitoring apparatus, as shown in a conceptual diagram of FIG. 1, cameras (nose view cameras) incorporated in the front of a vehicle pick up side views FL and FR in front of the vehicle, which are likely to be blind spots as viewed from a driver seat. The picked-up side views are displayed on a monitor at the driver seat in the vehicle so that the driver can confirm safety, for example, when advancing the vehicle into an intersection.

Also, in recent years, apparatuses that detect a moving object from images picked up by a camera installed in a vehicle using an optical flow method have been proposed in, for example, Japanese Laid-Open Patent Publication (Kokai) No. 2004-198211 (hereinafter referred to as Patent Document 2), Japanese Laid-Open Patent Publication (Kokai) No. 2004-56763 (hereinafter referred to as Patent Document 3), Japanese Laid-Open Patent Publication (Kokai) No. 2005-276056 (hereinafter referred to as Patent Document 4), and Japanese Laid-Open Patent Publication (Kokai) No. 2001-39248 (hereinafter referred to as Patent Document 5).

A movable body circumstance monitoring apparatus disclosed in Patent Document 2 is intended to identify the position and posture of a movable body without error accumulation and with high accuracy using a single image pickup means to ensure visibility at a desired position of the movable body. The apparatus extracts at least four feature points within a specific plane from an image of a peripheral area picked up by the single image pickup means during movement. When the movable body shifts from a first state to a second state, the apparatus causes a feature tracking means to track the extracted feature points, and causes a moving state identifying means to identify the relative position and posture of the image pickup means based on the plane coordinates of the feature points of the images picked up in the first and second states. Further, the apparatus causes a three-dimensional coordinate estimating means to estimate the three-dimensional coordinates of a feature point of a predetermined object based on the positions and postures of the image pickup means in the first and second states, the plane coordinates of the feature point of the predetermined object in the image picked up in the first state, and the plane coordinates of the feature point of the predetermined object in the image picked up in the second state.

A monitoring apparatus disclosed in Patent Document 3 is a vehicle monitoring apparatus that detects an approaching object using the optical flow method. The apparatus is intended to detect an approaching object with high accuracy even when a vehicle equipped with the monitoring apparatus is taking a curve. The apparatus calculates optical flows of feature points of a detected approaching object using a multi-resolution method or a pyramid method. In the multi-resolution method, a plurality of images with different resolutions are prepared in a hierarchical manner with respect to one image, optical flows are obtained by performing pattern matching in order from the roughest image to the finest image.

On the other hand, a nose view monitoring apparatus disclosed in Patent Document 4 calculates optical flows with respect to extracted feature points, and selects only feature points having a vector in an approaching direction as an approaching feature from among feature points of right and left views.

A vehicle camera apparatus disclosed in Patent Document 5 measures the distance to a moving object using a combination of a distance sensor and a camera.

In the above conventional monitoring apparatuses, however, an image picked up by the camera is basically a single view image. To find the distance to a moving object from a single view image, some sort of presumption or limitation is required. As an example of such presumption or limitation, there is a method in which a road plane within an image is presumed so as to find the distance to a moving object from a single view image. In this method, a ground plane of a moving object on an image is found, and the distance to a moving object is found from camera parameters (position, direction, focal length, etc.) and the position of the ground plane on the image. In general, however, it is difficult to recognize a ground plane on an image. Therefore, a ground plane to be recognized is limited to a ground plane of an automobile on an image shot from the front or rear. In general, however, it is difficult to view an object diagonally and recognizing a ground plane in order to recognize an approaching object included in the visual field as in the case of the above-mentioned nose view monitoring apparatus.

Also, it cannot be denied that measuring the distance to a moving object using a combination of a distance sensor and a camera as in the case of the vehicle camera apparatus disclosed in Patent Document 5 makes the apparatus expensive.

SUMMARY OF THE INVENTION

An aspect of the present invention is a vehicle periphery monitoring apparatus comprising: a camera installed in a front or rear of a vehicle, for picking up images of a side view of the vehicle; a feature point detecting means for detecting feature points in the side images and calculating the motion vectors of the detected feature points; an approaching object detecting means for detecting an object having a vector in such a direction as to approach the vehicle in the side images as an approaching object based on the calculated motion vectors of the feature points; a feature point tracking means for tracking the feature points of the detected approaching object; and a passage time calculating means for calculating a time at which the approaching object passes the front or rear of the vehicle from the feature points of the approaching object tracked by the feature point tracking means.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED INVENTION

Figure 1:
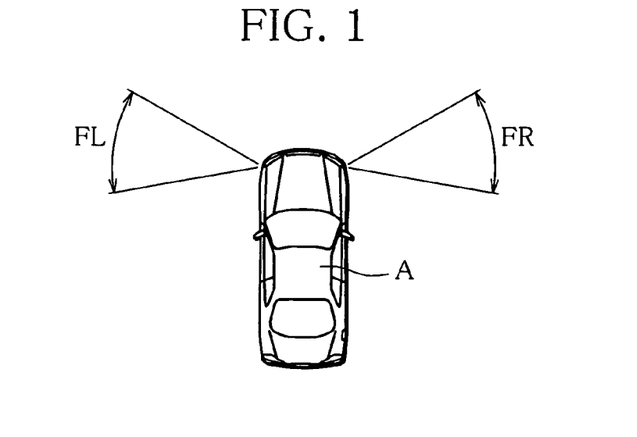
FIG. 1 is a plane view showing a vehicle equipped with a periphery monitoring apparatus and the directions of cameras.
Figure 2:
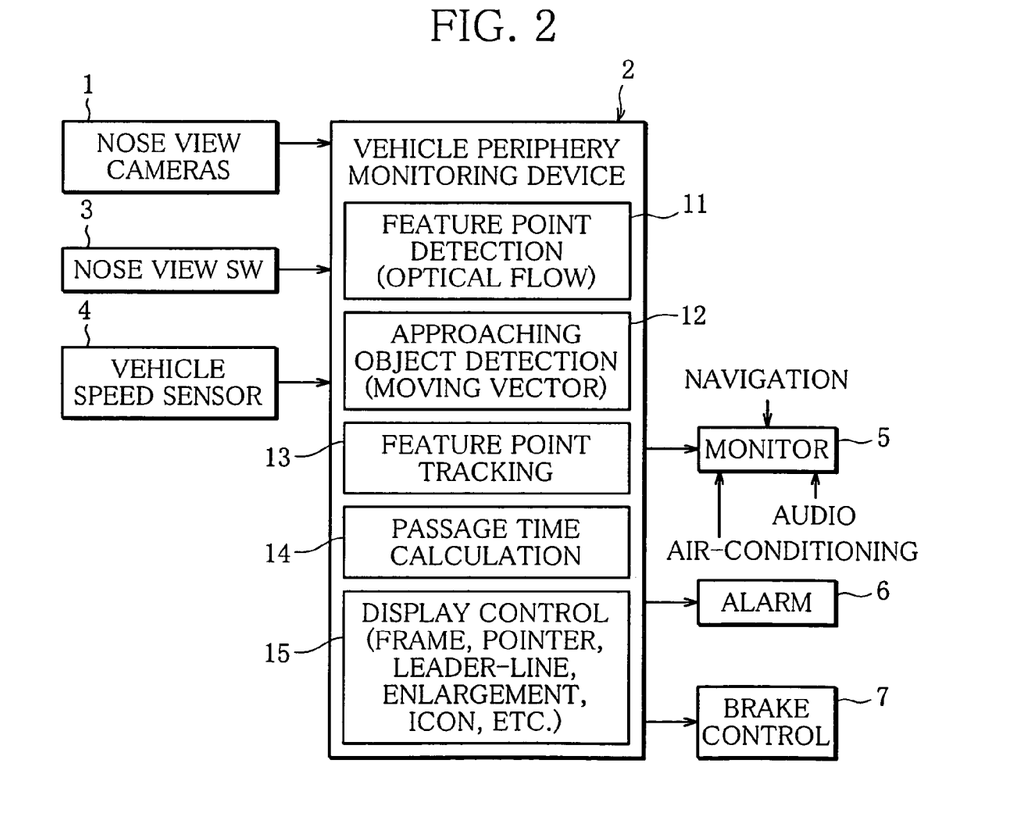
FIG. 2 is a block diagram schematically showing the configuration of the principal part of a vehicle periphery monitoring apparatus according to an embodiment of the present invention.

The present invention will now be described in detail with reference to the drawings showing an embodiment thereof. FIG. 2 is a block diagram schematically showing the configuration of the principal part of a vehicle periphery monitoring apparatus according to an embodiment of the present invention. In FIG. 2, reference numeral 1 denotes a pair of nose view cameras incorporated in the front of a vehicle, for picking up right and left views on both sides of the vehicle. The nose view cameras 1 are comprised of, for example, CCD cameras incorporated in both sides of the front end of a vehicle A as shown in FIG. 1, and are disposed to pick up predetermined right and left views FL and FR on both sides of the vehicle A. Alternatively, the nose view cameras 1 may be incorporated in the rear of a vehicle, for picking up right and left views on both sides of the vehicle.

Figure 3:
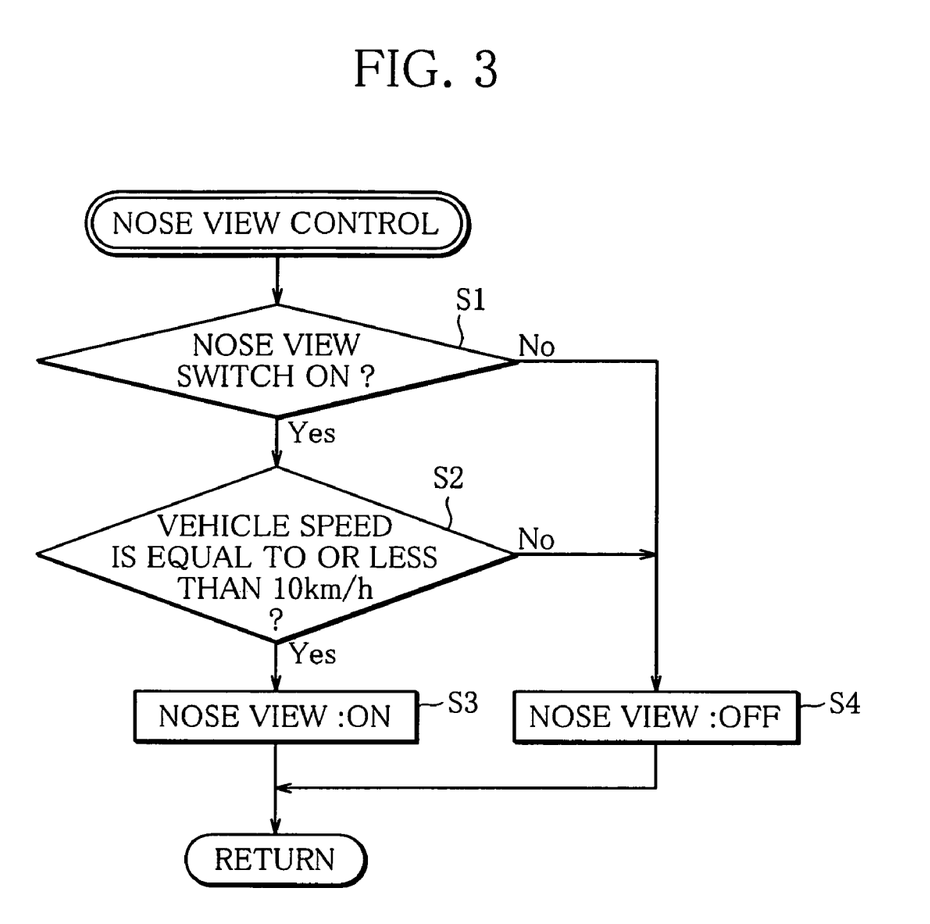
FIG. 3 is a flow chart showing a main procedure for controlling the operation of the vehicle periphery monitoring apparatus in FIG. 2.

A periphery monitoring device 2 that captures side images (nose view images) picked up by the nose view cameras 1 is comprised of an electronic control unit (MPU) comprised mainly of a microcomputer. On the condition that a nose view switch 3 is on (step S1), the periphery monitoring device 2 enables a nose view function to display side images (nose view images) picked up by the nose view cameras 1 on a monitor 5 (step S3) when the vehicle speed of the vehicle A detected by a vehicle speed sensor 4 is decreased to 10 km/h or less (step S2), or when the vehicle A comes to a standstill. When the above condition is not satisfied, the periphery monitoring device 2 disables the nose view function, so that no nose view image is displayed on the monitor 5 (step S4).

The monitor 5 for displaying the side images (nose view images) is comprised of a multi-display incorporated in a center console mounted in front of a driver seat. The monitor 5 is normally used to display information on car navigation using GPS, air-conditioning information for setting environments in a vehicle compartment, information on settings of various audio devices or the like. It goes without saying that the monitor 5 may be designed exclusively for displaying nose view images.

The vehicle periphery monitoring apparatus basically configured as described above is characterized in that as shown in FIG. 2, the periphery monitoring device 2 is comprised of (a) a feature point detecting section 11 as a feature point detecting means for detecting a plurality of feature points in a side image (nose view image) picked up using the nose view camera 1 as mentioned above, and calculating the optical flows of the feature points to obtain motion vectors thereof, (b) a moving object detecting section 12 as a moving object detecting means for detecting an object having a vector in a such a direction as to approach one's own vehicle (vehicle A) in the side image (nose view image) as an approaching object based on the motion vectors of the feature points obtained by the feature point detecting section 11, and (c) a passage time calculating section 14 as a passage time calculating means for identifying and tracking an image area of the approaching object detected by the moving object detecting section 12 in the side image (nose view image) (a feature point tracking section 13 as a feature point tracking means), and determines the time at which the approaching object passes the front of the vehicle based on the identified feature points.

Figure 4:
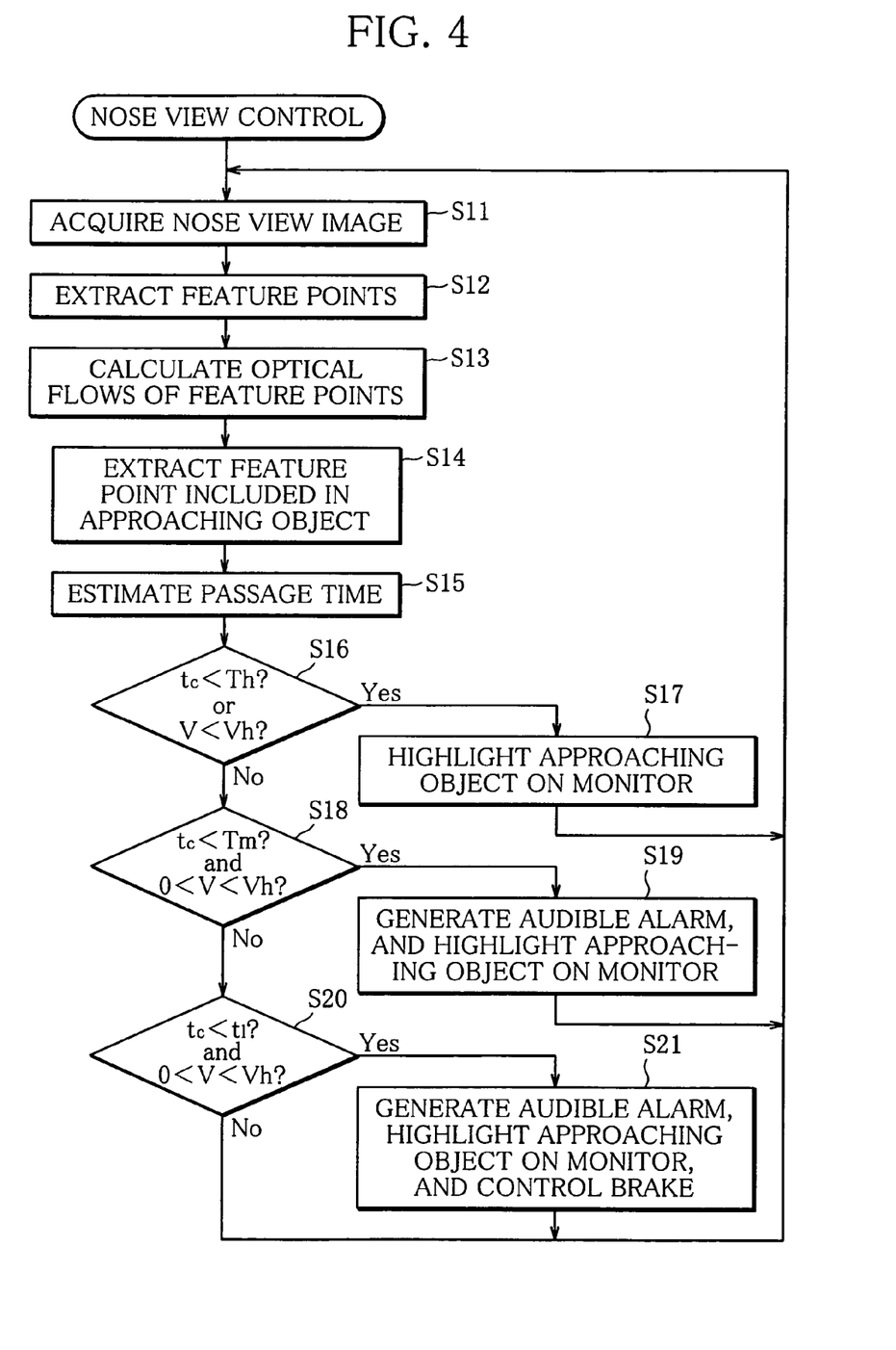
FIG. 4 is a flow chart showing a main process for detecting an approaching object and a procedure for calculating the time at which the approaching object is expected to pass a vehicle, which are carried out by the vehicle periphery monitoring apparatus in FIG. 2.

Specifically, a nose view process realized by the above sections (functions) 11, 12, 13, and 14 is started by, for example, sequentially acquiring nose view images, which have been picked up the nose view camera 1, at predetermined intervals as shown in FIG. 4 (step S11). Feature points of which image signal level (luminance) and/or hue is significantly different from those of the periphery are extracted (step S12), and the optical flows of the feature points are calculated to obtain the motion vectors of the feature points (step S13). The method to calculate the optical flows will now be briefly described, although it is described in detail in, for example, Patent Document 4 mentioned above. Basically, whether or not feature points common to a plurality of nose view images picked up sequentially at predetermined intervals have moved is determined according to whether or not the coordinates of the common feature points have changed. If the coordinates of the common feature points have changed, the directions and magnitudes of the movements (i.e., the changes in the coordinates) are calculated to obtain the motion vectors of the common feature points.

The moving object detecting section 12 then detects an approaching object based on optical flow vectors including a vector component in the direction in which the approaching object is headed from among the motion vectors obtained in the step S13 (step S14). On this occasion, the feature points of which motion vectors have not been detected are regarded as a fixed object (background) such as a building and excluded from recognition. Changes in the detected feature point with time are picked up by the feature point tracking section 13 (step S14). The passage time calculating section 14 calculates the time at which the approaching object passes the front of the vehicle based on information indicative on the changes in the feature points with time picked up by the feature point tracking section 13 (step S15).

When the estimated passage time $t_c$ obtained in step S15 is earlier than a predetermined passage time Th ($t_c$<Th), or the vehicle speed V is lower than a predetermined vehicle speed Vh (V <Vh), the periphery monitoring device 2 detects an approaching object (step S16), switches the screen view of the monitor 5 or the like to a nose view image, and causes a display control section 15 to highlight the approaching object on the monitor 5 (step S17). The approaching object is highlighted by, for example, cutting out the above-mentioned feature points and the periphery thereof in a rectangular shape. To clearly indicate the cut-out approaching object in the nose view image displayed on the monitor 5, the display control section 15 then highlights a specific image area including the approaching object by, for example, drawing a rectangular box around the image area.

On the other hand, when the estimated passage time $t_c$ obtained in step S15 is earlier than a predetermined passage time Tm ($t_c$<Tm), and the vehicle speed V is lower than the predetermined vehicle speed Vh (0<V<Vh) (step S18), the periphery monitoring device 2 determines that the approaching object is approaching further, causes a warning device 6 to generate an audible alarm, and causes the display control section 15 to highlight the approaching object on the monitor 5 or the like more conspicuously than in the above-mentioned step S17 (step S19). The display control section 15 highlights the approaching object on the monitor 5 by, for example, coloring it in red, yellow, or the like.

On the other hand, when the estimated passage time $t_c$ obtained in the step S15 is earlier than a predetermined passage time Tl ($t_c$<Tl), and the vehicle speed V is lower than the predetermined vehicle speed Vh (0<V<Vh) (step S20), the periphery monitoring device 2 outputs a command to a brake control section 7 as a vehicle brake control means, so that the vehicle is stopped so as to avoid collision with the approaching object. On this occasion, the periphery monitoring device 2 warns the driver by highlighting the approaching object on the monitor 5 or the like more conspicuously than in the above-mentioned step S19 (step S21). The approaching object may be highlighted by, for example, enlarging and superimposing it on the monitor 5, or adding a leader line to it.

In this case, at the same time the approaching object is highlighted on the monitor 5, not only the warning device 6 is caused to generate an audible alarm, but also a notifying device may be used to notify the driver of the presence of the approaching object via a voice message. By using the warning device 6 and the notifying device in combination, the driver's attention can be called to the approaching object since the nose view image and the voice message appeal to the eyes and the ears. Thus, the periphery monitoring apparatus can be very advantageous from a practical perspective because it can assist the driver more effectively in confirming safety when advancing the vehicle into an out-of-sight intersection or the like.

The predetermined passage time Th in the step S16 is, for example, 5 to 3 seconds, the predetermined passage time Tm in the step S18 is, for example, 3 to 2 seconds, and the predetermined passage time Tl in the step S20 is, for example, 2 to 1 second. On the other hand, the predetermined vehicle speed Vh is a forward speed of as low as about 10 km/h at the maximum, and is set in advance in the periphery monitoring device 2.

Figure 5:
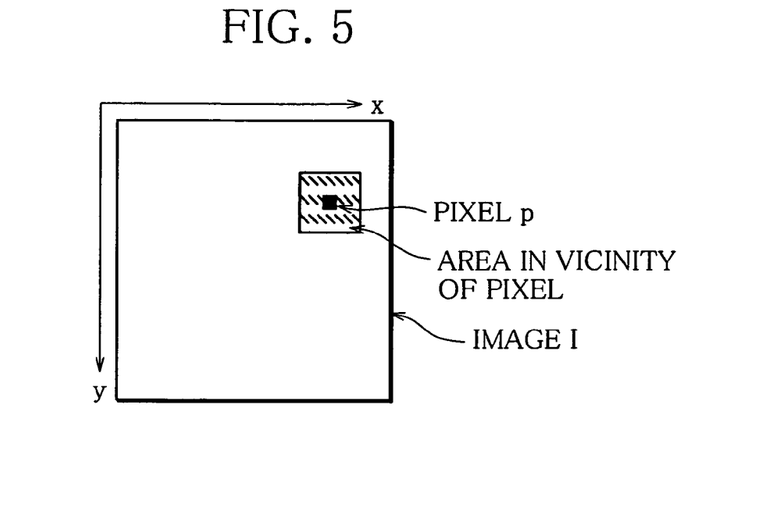
FIG. 5 is a diagram showing an example in which feature points included in image data picked up by a camera of the vehicle periphery monitoring apparatus in FIG. 2 are extracted.

The feature point detecting process carried out by the vehicle periphery monitoring apparatus according to the present invention will now be described in further detail. Assume that an image picked up by the camera lies on coordinates where the ordinate represents the y-axis and the abscissa represents the x-axis with the origin at the upper left corner of image data as shown in FIG. 5. First, the feature point detecting section 11 obtains partial differentials ∂I/∂x and ∂I/∂y with respect to the respective directions of the x- and y-axes of an image I. The feature point detecting section 11 then obtains spatial matrices G (p) of all the pixels of the image I using the following equation (1):

$$G(p) = \begin{bmatrix} \sum_{q \in D(p)} \left(\frac{\partial I(q)}{\partial x}\right)^2 & \sum_{q \in D(p)} \frac{\partial I(q)}{\partial x} \cdot \frac{\partial I(q)}{\partial y} \\ \sum_{q \in D(p)} \frac{\partial I(q)}{\partial x} \cdot \frac{\partial I(q)}{\partial y} & \sum_{q \in D(p)} \left(\frac{\partial I(q)}{\partial y}\right)^2 \end{bmatrix} \quad (1)$$

The feature point detecting section 11 then calculates eigenvalues λmin(p) and λmax(p) with respect to the spatial matrices G(p), extracts predetermined values regarded as having features, and defines them as feature points.

Next, the feature point tracking section 13 then tracks changes in the future points of the nose view image with time, which have been obtained in the above-mentioned manner. The passage time calculating section 14 then calculates the time at which the approaching object passes the front of the vehicle A based on the feature points of the approaching object tracked by the feature point tracking section 13.

Figure 6:
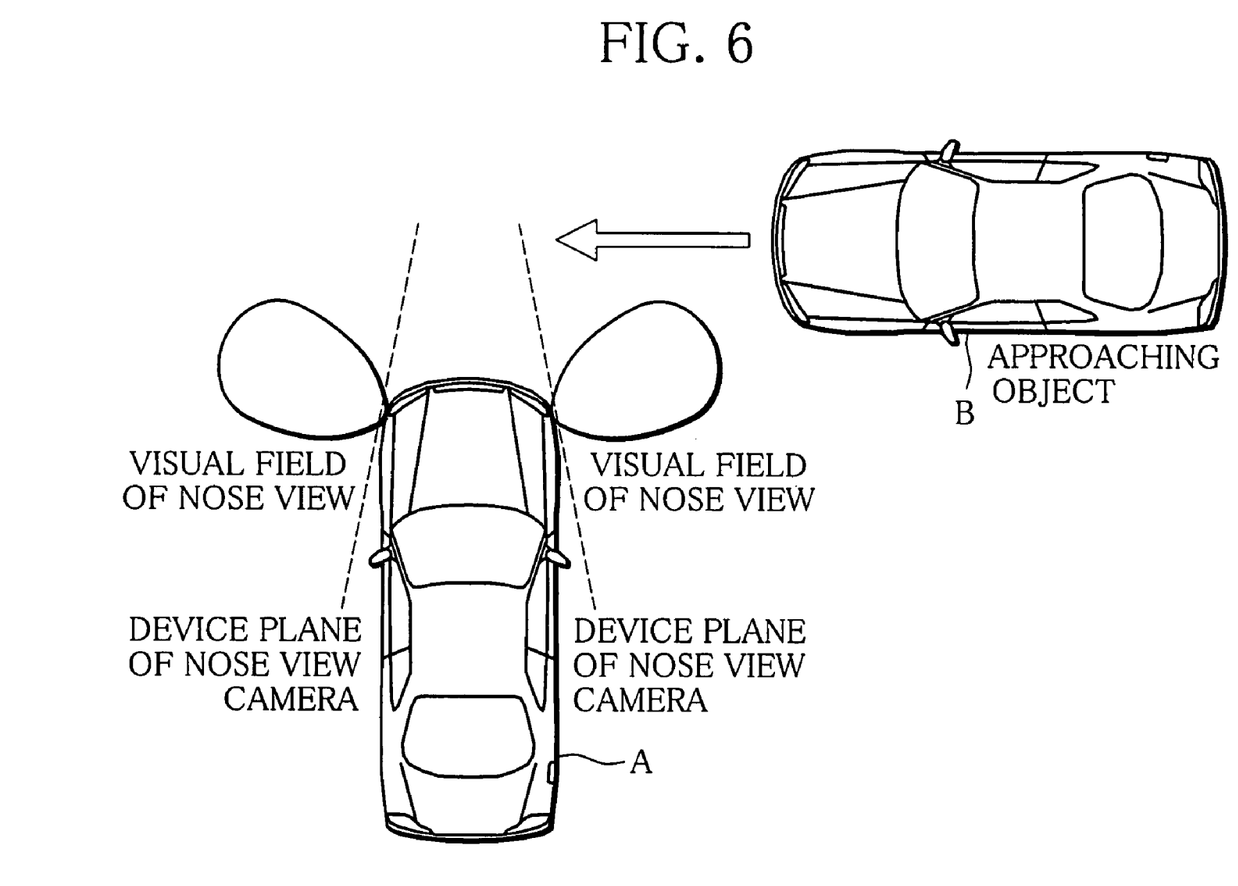
FIG. 6 is a plan view showing the visual field of the cameras of the vehicle periphery monitoring apparatus in FIG. 2 and the relationship between device planes of the cameras and an approaching object.

More specifically, as described above, the nose view cameras 1 are mounted at substantially right angles to the direction in which the vehicle (one's own vehicle) A advances, i.e., at such locations as to view side areas (the right side FR and the left side FL) around the vehicle A as shown in FIG. 6. In this case, the time at which the approaching object B passes the front of the vehicle A can be regarded as the time at which the approaching object B crosses planer spaces extending in the direction of the surface of the photo-sensitive devices of the nose view cameras 1.

To obtain such estimated passage time, several methods can be envisaged; in the embodiment of the present invention, such computation as to improve robustness against noise by obtaining a plurality of frames from the tracks of a plurality of feature points is used. It should be noted that the "noise" means the error between the calculated track and the real track of feature points.

Next, a description will be given of the principle of estimated passage time calculation according to the present invention with reference to a principle diagram of FIG. 7.

Assume that the coordinates of a feature point i at a time $t_f$ are $(x_i(t_f), y_i(t_f))$. The following determinant of matrix W is set up:

$$W = \begin{bmatrix} x_1(t_1) & \cdots & x_P(t_1) \\ \vdots & \ddots & \vdots \\ x_1(t_F) & \cdots & x_P(t_F) \\ y_1(t_1) & \cdots & y_P(t_1) \\ \vdots & \ddots & \vdots \\ y_1(t_F) & \cdots & y_P(t_F) \end{bmatrix} - \begin{bmatrix} \bar{x}(t_1) \\ \vdots \\ \bar{x}(t_F) \\ \bar{y}(t_1) \\ \vdots \\ \bar{y}(t_1) \end{bmatrix} [1 \cdots 1] \quad (2)$$

where F is the number of frames to be tracked (≧3) with respect to the feature point, P is the number of all feature points P (≧3), $t_1$ is the time at which tracking is started, and $t_F$ is the present frame time.

Here, $$[\bar{x}(t_F), \bar{y}(t_F)]^T \quad (3)$$

is the center of all feature points at the time $t_f$ and can be expressed by the following equations:

$$\bar{x}(t_f) = \frac{1}{P} \sum_{i=1}^{P} x_i(t_f) \quad (4)$$

$$\bar{y}(t_f) = \frac{1}{P} \sum_{i=1}^{P} y_i(t_f) \quad (5)$$

The present invention may be applied not only to a weak perspective projection model and an orthographic projection model, but also to a parallel perspective projection model similar to the actual perspective projection. In the following description, the present invention is applied to a weak perspective projection model.

Figure 7:
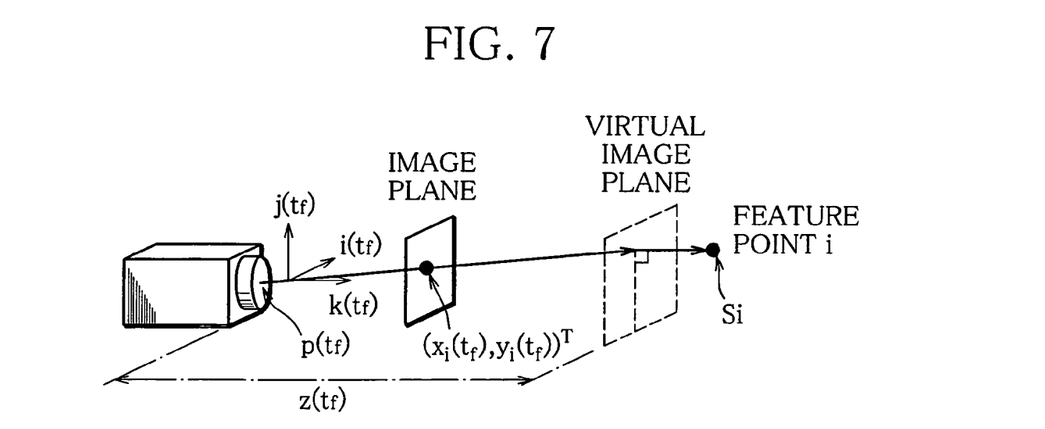
FIG. 7 is a principle diagram showing the relationship between the camera, an image plane, and a virtual image plane in weak perspective projection performed on image data picked up by the camera of the vehicle periphery monitoring apparatus in FIG. 2.
Figure 8:
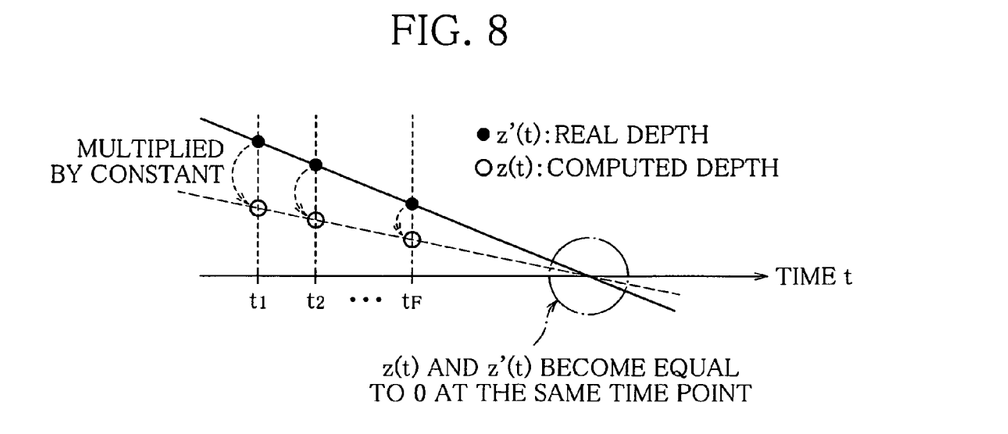
FIG. 8 is a diagram showing the relationship between the depth computed by the vehicle periphery monitoring apparatus in FIG. 2 and the real depth.

First, assume that on a three-dimensional real space shown in FIG. 7, the location of the nose view camera 1 is represented by $p(t_f)$, a vector in the direction of the optical axis of the nose view camera 1 is represented by $k(t_f)$, and vectors in vertical and horizontal directions in the space where the nose view camera 1 exists are represented by a vertical vector $j(t_f)$ and a horizontal vector $i(t_f)$, respectively. In FIG. 7, the vectors $i(t_f)$, $J(t_f)$, and $k(t_f)$ are unit vectors perpendicular to one another. It is assumed that the feature points are fixed in the real space, visible changes on the image are brought about by motion of the camera, and the position of the feature point i in the real space is expressed by the following equation, $s_i = (x_i, y_i, z_i)^T$.

In the weak perspective projection, transformation of a real space into an image can be linearly performed by an equation for the transformation. The weak perspective projection is a method in which a virtual image plane parallel with an image plane is simulated as shown in FIG. 7. When the virtual image plane is simulated, the feature point i is orthogonally projected first onto the virtual image plane and then perspective-projected from the virtual image plane onto the image plane.

The coordinates of the feature point i on the image at the time $t_f$ by such weak perspective projection are expressed by the following equations:

$$x_i(t_f) = \frac{1}{z(t_f)} i(t_f)^T [s_i - p(t_f)] \quad (6)$$

$$y_i(t_f) = \frac{1}{z(t_f)} j(t_f)^T [s_i - p(t_f)] \quad (7)$$

where $z(t_f)$ is a parameter representing the distance between the camera and the virtual image plane.

In the case of the weak perspective projection model described above, it is assumed that the origin in the real space is at a vector c indicating the center of all feature points, and the origin in the real space, i.e., the center of all feature points is on the virtual image plane. Thus, the following equation can be set up:

$$c = \frac{1}{p} \sum_{i=1}^{P} s_i Z(t_f) = k(t_f)^T [c - p(t_f)] = 0 \quad (8)$$

In this case, $z(t_f)$ is redefined as the depth between the center of all feature points and the camera. The determinant of matrix W expressed by the above equation (2) can be decomposed into two matrices M and S as expressed by the following equations (9) and (10) where W=MS:

$$M = \begin{bmatrix} m(t_1)^T \\ \vdots \\ m(t_F)^T \\ n(t_1)^T \\ \vdots \\ n(t_F)^T \end{bmatrix} \quad (9)$$

$$S = [s_1 \cdots s_P] \quad (10)$$

Here, the vector $m(t_f)$ is represented by $i(t_f)/z(t_f)$, and the vector $n(t_f)$ is represented by $j(t_f)/z(t_f)$. The vectors $i(t_f)$ and $j(t_f)$ define the posture of the camera at the time $t_f$, and the vector $z(t_f)$ defines the depth between the center of all feature points and the camera. That is, the matrix M represents information on the relative motion of the object and the camera. The elements $s_i$ of the matrix S represent the positions of the feature points in the real space. Thus, the matrix S represents information on the shape of the object in the real space.

That is, one of the major features of the present invention is that the matrix W representing the appearance of feature points on the image is input and decomposed into the motion matrix M representing the relative motions of the feature points and the camera in a real space and the shape matrix S representing the positions of the feature points in the real space, and then the time at which an approaching object is expected to pass the vehicle is computed.

The vehicle periphery monitoring apparatus according to the embodiment of the present invention having the above-mentioned feature will now be described in further detail. It should be noted that the vehicle periphery monitoring apparatus according to the embodiment of the present invention employs weak perspective projection or parallel perspective projection, and a computational procedure therefor should not be particularly limited insofar as the matrix W can be decomposed into the motion matrix M and the shape matrix S.

When the matrix W is decomposed into singular values, the following equation is obtained:

$$W = U \sum V^T \quad (11)$$

$$= [u_1 \cdots u_L] \begin{bmatrix} \sigma_1 & 0 & 0 & \cdots & 0 \\ 0 & \sigma_2 & 0 & \ddots & \vdots \\ 0 & 0 & \sigma_3 & \ddots & 0 \\ \vdots & \ddots & \ddots & \ddots & 0 \\ 0 & \cdots & 0 & 0 & \sigma_L \end{bmatrix} \begin{bmatrix} V_1^T \\ \vdots \\ V_L^T \end{bmatrix}$$

Here, the matrix U is a 2F×L orthogonal matrix, the matrix Σ is an L×L diagonal matrix, the matrix $V^T$ is an L×P orthogonal matrix, and L takes a smaller value of 2F and P. In the diagonal matrix Σ, elements are arranged in descending order: $\sigma_1 \geq \sigma_2 \geq \ldots \geq \sigma_L$. Note that F is the number of frames.

The magnitudes of the matrices M and S will now be described. Since the vectors $i(t_f)$ and $j(t_f)$ are on the three-dimensional real space, the vectors $m(t_f)$ and $n(t_f)$ formed by the vectors $i(t_f)$ and $j(t_f)$ are also three-dimensional vectors. On the other hand, since the number of frames is F as mentioned above, and there are F frames at each of the vectors $m(t_f)$ and $n(t_f)$, the magnitude of the matrix M formed by the vectors $m(t_f)$ and $n(t_f)$ is 2F×3. Similarly, the vector $s_i$, which represents the position on the three-dimensional real space, is a three-dimensional vector as well. Also, since the number of feature points is P, the magnitude of the matrix S formed by the vectors $s_i$ is 3×P. On the other hand, since the matrix W is the product of the matrix M and the matrix S as apparent from the above equations (7) and (8), the rank of the matrix W is equal to or less than 3 considering the magnitudes of the matrices M and S.

Here, if the equation (11) is approximated by the product of a 2F×3 matrix U' as the first three columns of the matrix U, a 3×3 diagonal matrix Σ', and a 3×P matrix $V'^T$ as the first three rows of the matrix $V^T$ in the equation (11), the following equation (12) is obtained:

$$W = U' \sum{}' V'^T \quad (12)$$

$$= [u_1 \; u_2 \; u_L] \begin{bmatrix} \sigma_1 & 0 & 0 \\ 0 & \sigma_2 & 0 \\ 0 & 0 & \sigma_3 \end{bmatrix} \begin{bmatrix} V_1^T \\ V_2^T \\ V_L^T \end{bmatrix}$$

In general, the matrix W includes noise such as tracking errors of singular points. Thus, the rank of the matrix W cannot always be equal to or less than 3. If, however, the matrix W is decomposed with values from $\sigma_4$ onward regarded as 0 as expressed by the above equation (12), the best approximate solution can be obtained as in the least-squares method. That is, the present invention has the advantage that robustness can be ensured since noise components are eliminated in advance in the simulation in decomposition into singular points.

Here, by the use of the decomposition result in the equation (12), the following decomposition result can be obtained:

$$\hat{M} = U' \quad (13)$$

$$\hat{S} = \Sigma' V'^T \quad (14)$$

By such decomposition, the equation (12) can satisfy the following equation:

$$W = \hat{M}\hat{S} \quad (15)$$

The decomposition expressed by the equation (15), however, is not unique. Specifically, the matrices M and S expressed by the equations (13) and (14), respectively, are typically different from each other. If the matrices M and S are set up as follows, a suitable 3×3 matrix A that links them can be found:

$$M = \hat{M}A \quad (16)$$

$$S = A^{-1}\hat{S} \quad (17)$$

Here, the vectors $m(t_f)$ and $n(t_f)$ forming the matrix M as shown in the equation (9) are now focused on. The vectors $m(t_f)$ and $n(t_f)$ are formed of vectors $i(t_f)$ and $j(t_f)$, respectively. The vectors $i(t_f)$ and $j(t_f)$ are orthogonal to each other in an orthogonal coordinate system as shown in FIG. 7. Thus, the vectors $m(t_f)$ and $n(t_f)$ have to satisfy the conditions expressed by the following equations:

$$m(t_f)^T m(t_f) = n(t_f)^T n(t_f)^T n(t_f) = \frac{1}{z(t_f)^2} \quad (18)$$

$$m(t_f)^T n(t_f) = 0 \quad (19)$$

The matrices M and S expressed by the equations (16) and (17), respectively, can be obtained if the conditions expressed by the above equations (18) and (19) are satisfied. Since $z(t_f)$ representing the depth between the center of all feature points and the camera at the time $t_f$ is unknown, satisfying only the conditions expressed by the equations (18) and (19) is not enough. For example, even when the vector $m(t_f)=0$ and the vector $n(t_f)=0$, the conditions expressed by the equations (18) and (19) are satisfied. For this reason, it is necessary to add the condition expressed by the following equation:

$$m(t_F)^T m(t_F) = n(t_F)^T n(t_F) = 1 \quad (20)$$

The equation (20) means that the depth between an approaching object and the camera at the time $t_F$, i.e., in the present frame is assumed to be 1. Because of the condition expressed by the equation (20), the matrices M and S obtained at last represent relative quantities with reference to the present frame. Thus, $z(t_f)$ representing the depth between the center of all feature points and the camera cannot be calculated as an absolute value, for example, by the meter, but can be computed with respect to the estimated passage time as described later.

A description will now be given of how the estimated passage time is calculated by the vehicle periphery monitoring apparatus according to the present invention. After the matrix W is decomposed into the matrices M and S as expressed by the above equation (7), the motion matrix M is analyzed. In particular, by focusing on $z(t_f)$ representing the depth between the center of all feature points and the camera, the following equation is obtained:

$$M = \begin{bmatrix} m(t_1)^T \\ \vdots \\ m(t_F)^T \\ n(t_1)^T \\ \vdots \\ n(t_F)^T \end{bmatrix} \quad (21)$$

where the vector $m(t_f)=i(t_f)/z(t_f)$, the vector $n(t_f)=j(t_f)/z(t_f)$, and $1 \leq f \leq F$.

The vectors $i(t_f)$ and $j(t_f)$ are unit vectors. Thus, the variable $z(t_f)$ can be easily obtained as expressed by the following equation:

$$z(t_f) = \frac{\|m(t_f)\| + \|l(t_f)\|}{2}, 1 \leq f \leq F \quad (22)$$

The equation (20) adopted in the above described computation is equivalent to the following equation, $z(t_f)=1$. Time-series data representing the depth between the center of all feature points and the camera, which is obtained from the equation (22), means time-series data on the relative quantity with respect to the real depth at the time $t_F$. Specifically, to obtain the real depth between the center of all feature points and the camera, the variable $z(t_f)$ has to be multiplied by a constant, but the constant is unknown. Therefore, the equation $z(t_f)=z'(t_f)/z'(t_F)$ and the equation $z'(t_f)=\alpha \cdot z(t_f)$ where $1 \leq f \leq F$ are considered. In these equations, $z'(t_f)$ is the real depth between the center of feature points and the camera. On the other hand, $\alpha$ is an unknown constant that satisfies the following condition, $\alpha > 0$. To obtain the unknown constant $\alpha$, it is necessary to acquire some sort of knowledge (an actual depth at a certain time) in advance. In the actual road environments, however, it is extremely difficult to acquire knowledge in advance.

Therefore, considering the time at which both the depth $z(t)$ found in the above computation and the real depth $z'(t)$ become equal to 0, the real depth $z'(t)$ must be equal to 0 if the depth $z(t)$ is equal to 0 whatever is the value taken by the unknown constant $\alpha$ as shown in the above equations. Conversely, if $z(t) \neq 0$, the real depth $z'(t)$ must not be equal to 0. Thus, when the computed depth $z(t)$ is equal to 0, the real depth $z'(t)$ is equal to 0 irrespective of the value of the unknown constant $\alpha$.

Figure 9:
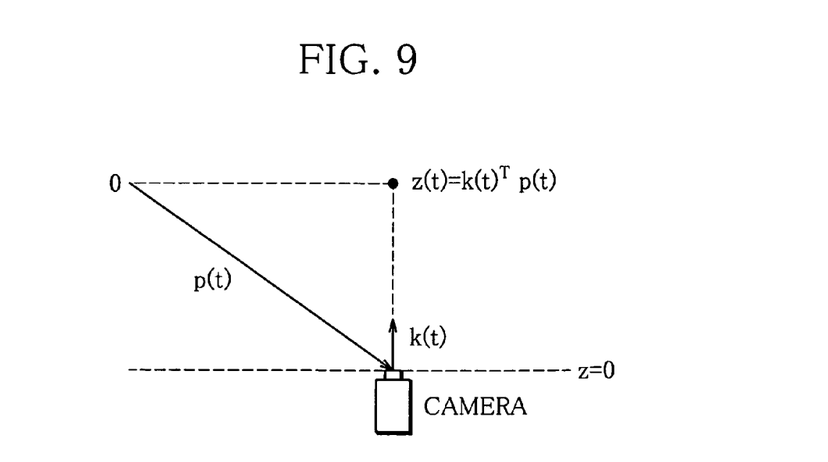
FIG. 9 is a plan view obtained by redrawing FIG. 7 by viewing from above.

On the other hand, assume that the real depth $z(t)$ is equal to 0 in the vehicle periphery monitoring apparatus. FIG. 9 is obtained by redrawing FIG. 7 by viewing from above. In FIG. 9, the depth $z(t)$ is the inner product of the vector formed by the center of the camera and all feature points and the vector formed by the optical axis of the camera. Therefore, when $z(t)=0$, the center of all feature points matches the optical axis of the camera. That is, the center of all feature points (i.e., the center of an approaching object) lies on the plane of the photo-sensitive device of the camera. In other words, when the depth $z(t)$ is equal to 0, an approaching object is passing the plane of the photo-sensitive device of the camera.

In the vehicle periphery monitoring apparatus, when an approaching object is passing an area (the plane of the photo-sensitive device of the camera) in front of one's own vehicle, it can be considered that the depth $z(t)$ is equal to 0. That is, the estimated passage time is the time $t_c$ that satisfies the following condition, $z(t_c)=0$.

More specifically, the regression line $z(t)=at+b$ is assigned to the time-series data $z(t_f)$ ($1 \leq f \leq F$) on the depth between the center of all feature points and the camera, which is obtained using the equation (22), and the time $tc=-(a/b)$ that satisfies the regression line $z(t)=0$ is obtained as the estimated passage time. The times-series depth data $z(t_f)$ ($1 \leq f \leq F$) thus obtained is likely to include noise as mentioned above.

In obtaining the regression line, however, noise is eliminated by carrying out the least-squares method as mentioned above, and hence the estimated passage time includes noise suppressed to the minimum possible level. Further, noise is suppressed in the decomposition into singular values. As a result, the vehicle periphery monitoring apparatus according to the present invention can still further curb the influence of noise, and therefore the estimated passage time at which an approaching object is expected to pass the front of the vehicle can be calculated with higher accuracy.

As described above, the vehicle periphery monitoring apparatus according to the embodiment of the present invention is comprised of the feature point detecting section 11 that detects feature points in side images picked up by the nose view cameras 1 and calculates the motion vectors of the detected feature points, the approaching object detecting section 12 that detects an object having a vector in such a direction as to approach the vehicle in the side images as an approaching object based on the calculated motion vectors of the feature points, the feature point tracking section 13 that tracks the feature points of the detected approaching object, and the passage time calculating section 14 that calculates the time at which the approaching object passes the front of the vehicle based on the feature points of the approaching object tracked by the feature point tracking section 13. In particular, the feature point detecting section 11 is adapted to calculate the optical flows of the feature points in the side images.

Thus, the vehicle periphery monitoring apparatus according to the present invention extracts feature points of, for example, corners of an approaching object that is approaching the vehicle A from side images picked up by the nose view cameras 1, and computes the estimated passage time at which the approaching object is expected to pass the front of the vehicle based on the tracks of the feature points. Therefore, the vehicle periphery monitoring apparatus according to the present invention can estimate the time at which an approaching vehicle or an approaching pedestrian pass the front of one's own vehicle with high accuracy from side images picked up by the nose view cameras 1.

The vehicle periphery monitoring apparatus according to the present invention is further comprised of the approach notifying devices (display control section 15 and the warning device 6) for notifying the driver that an object is approaching, for example, by generating an audible alarm in accordance with an estimated passage time obtained in the above-mentioned manner. Thus, the vehicle periphery monitoring apparatus according to the present invention can indicate the presence of an approaching object by highlighting the approaching object on the monitor 5 installed in the vehicle or causing the warning device 6 to generate an audible alarm in accordance with the estimated passage time calculated by the passage time calculating section.

Further, the vehicle periphery monitoring apparatus according to the present invention is comprised of the vehicle speed sensor 4 as a speed detecting means for detecting the speed of the vehicle. When the vehicle speed detected by the vehicle speed sensor 4 is equal to or less than a predetermined speed, e.g., when the vehicle speed is equal to or less than about 10 km/h, and it is determined that the estimated passage time will be within a predetermined period of time (for example, within several seconds), the brake may be controlled to stop the vehicle A safely so as to avoid collision with the approaching object.

Also, at the same time when an approaching object is highlighted on the monitor 5 and an audible alarm is generated by the warning device 6 as described above, information indicative of the presence of the approaching object may be notified to the driver via a voice message. By using such notifying devices in combination, the driver's attention can be called to the approaching object since the nose view image and the alarm appeal to the eyes and the ears, and hence the vehicle periphery monitoring apparatus is very advantageous from a practical perspective because it can assist the driver more effectively in confirming safety when advancing the vehicle into an out-of-sight intersection or the like.

It is to be understood that the present invention is not limited to the above described embodiment. For example, the angle of view (the shooting angle of view) and image pickup direction of the nose view cameras 1 may be determined according to the specifications required for the vehicle. Although in the above description, the nose view cameras 1 are incorporated in the front of the vehicle, the present invention is not limited to this, but the nose view cameras 1 may be incorporated in the rear of the vehicle. The nose view cameras 1 incorporated in the rear of the vehicle are advantageous, for example, where the driver backs the vehicle from the garage. Further, the enlargement factor in enlarging an approaching object displayed on the monitor 5 may be arbitrarily determined according to the size of the screen of the monitor 5 and the size of the approaching object detected from nose view images.

Also, it is to be understood that the vehicle periphery monitoring apparatus according to the present invention is not limited to the embodiment described above, but various changes in or to the above described embodiment may be possible without departing from the spirits of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle periphery monitoring apparatus, comprising:
    a camera installed in a front or rear of a vehicle, for picking up images of a side view of the vehicle;
    a feature point detecting unit that detects feature points in the side images and calculating motion vectors of the detected feature points;
    an approaching object detecting unit that detects an object having a vector in such a direction as to approach the vehicle in the side images as an approaching object based on the calculated motion vectors of the feature points;

a feature point tracking unit that tracks the feature points of the detected approaching object;

a passage time calculating unit that calculates a time at which the approaching object passes the front or rear of the vehicle from the feature points of the approaching object tracked by said feature point tracking unit; and an approach notifying unit that notifies a driver that the approaching object is approaching, the approaching notifying unit including first notifying means and second notifying means, wherein said approaching notifying unit notifies the driver that the approaching object is approaching only by the first notifying means when a length of the calculated time until which the approaching object is expected to pass the front or rear of the vehicle is shorter than a first predetermined time, and notifies the driver at least by the second notifying means when the length of the calculated time is shorter than a second predetermined time shorter than the first predetermined time, and further comprising speed detecting means for detecting a speed of the vehicle, and a brake control unit that controls a brake of the vehicle to stop the vehicle when the speed detected by said speed detecting unit it equal to or less than a predetermined speed and said passage time calculating unit determines that the approaching object is expected to pass the front or rear of the vehicle within a third predetermined time shorter than the second predetermined time.

2. A vehicle periphery monitoring apparatus according to claim 1, wherein said feature point detecting unit obtains the motion vectors by calculating optical flows of the feature points in the side images.

3. A vehicle periphery monitoring apparatus according to claim 1, wherein the first notifying means is a display monitor that highlights displays the approaching object.

4. A vehicle periphery monitoring apparatus according to claim 1, wherein the second notifying means is an audible alarm.

5. A vehicle periphery monitoring apparatus according to claim 1, wherein said approaching notifying unit notifies the driver by the first notifying means and the second notifying means when the length of the calculated time is shorter than the second predetermined time.

6. A vehicle periphery monitoring apparatus according to claim 1, wherein the approach notifying unit notifies the driver that the approaching object is approaching only when the detected speed of the vehicle is lower than a predetermined speed.

* * * * *